Feb. 4, 1969

J. T. McNANEY 3,426,147

LIGHT GATE SYSTEM MEANS

Filed Aug. 3, 1966

INVENTOR.

Joseph T. McNaney

United States Patent Office 3,426,147
Patented Feb. 4, 1969

3,426,147
LIGHT GATE SYSTEM MEANS
Joseph T. McNaney, 8548 Boulder Drive,
La Mesa, Calif. 92041
Filed Aug. 3, 1966, Ser. No. 570,047
U.S. Cl. 178—7.87
Int. Cl. H01j 29/89; H04n 5/44, 5/76
8 Claims

ABSTRACT OF THE DISCLOSURE

A light valve having a plurality of light guides each individually surrounded by an electrical conductor said light guide additionally having an adjustable refracting surface adjacent one end of said guide. A corona generator supplies positive ions to the outer portion of said refracting surface while an electron beam deposits electrons on the inner portion establishing an electric field which in turn deforms the refracting surface. A light bean projected through the light guides follows divergent paths beyond the limits of a mask in accordance with deformation of the refracting surface.

---

This invention relates to means for utilization in a light gate system, wherein the passage of light through a light gate means is controlled by a primary source of radiant energy.

The light gate system means of this invention utilizes as a basic means, either one or a plurality of light guides having the ability to conduct light therethrough to an output end thereof and intimately joined with the output end I provide adjustable light focussing means. In one embodiment herein I utilize radiant energy in the form of an electron beam to control the focussing means, and in another embodiment I utilize radiant energy in the form of light to control the focussing means. In each case a light focussing action at the output end of a light guide is used to regulate the passing of light through a light gate system. The passage of an intense light through a panel array of light guides, therefore, may be controlled by a primary source of radiant energy in accordance with predetermined light images and projected on a viewing screen, for example.

Accordingly, an object of the present invention is to provide an improved image projection system utilizing light guides in combination with radiant energy controlled focussing means adjacent the output end of the light guides.

Another object is to provide an improvement in the operating speed, efficiency and image resolution in image projection systems.

Other objects and advantages will appear hereinafter as a description of the invention proceeds.

Novel features believed characteristic of the invention are set forth in the appended claims. The invention itself, both as to its organization and method of operation will best be understood from the following description when read in conjunction with the accompanying drawing in which:

Figure 1:
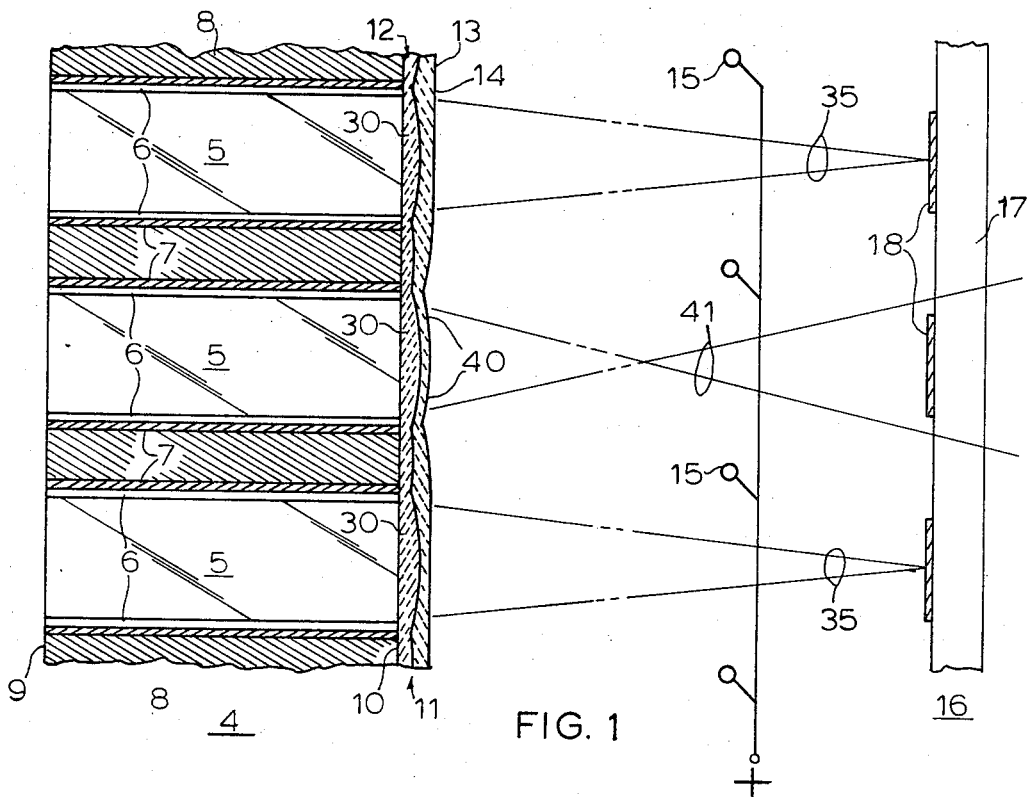
FIGURE 1 is a diagram of a portion of a light gate system utilizing the invention.

Referring now to FIGURE 1, a light focussing unit 4 includes a plurality of light guides 5 and combined therewith a light refracting jacket 6. The unit 4 is shown in cross section and is but a small portion of a panel array of such guides 5. The light guides 5 illustrated also are greatly oversize since in a preferred system each guide 5 will be on the order of 0.001″ in diameter to possibly 0.1″ in diameter. Their diameter and length will be governed by the intended application of the invention in each particular case. Adjacent the outer surface of the jacket 6 of each guide 5, I show an electrical conducator means 7, which is preferably deposited thereon prior to being assembled into a panel array and bonded together by means of an electrical insulating type of bonding agent, or cement. The guides 5–6 and the conductor means 7 extend from a first end surface 9 to a second end surface 10 of the array, and each surface will be optically smooth.

Adjustable light focussing means 11 is intimately joined with the second end surface 10, and it comprises a first layer of light conducting material 12 and a second layer of light conducting material 13. The first layer 12 will consist of a thermoplastic material such as a medium molecular weight polystyrene and the second layer 13 will consist of an oil film. Closely adjacent a surface 14 of the layer 13 I provide a corona generator 15 and a predetermined distance from layer 13 there is a light masking member 16 consiting of a transparent plate 17 for supporting an opaque mask 18 for each light guide 5 in the unit 4.

Figure 2:
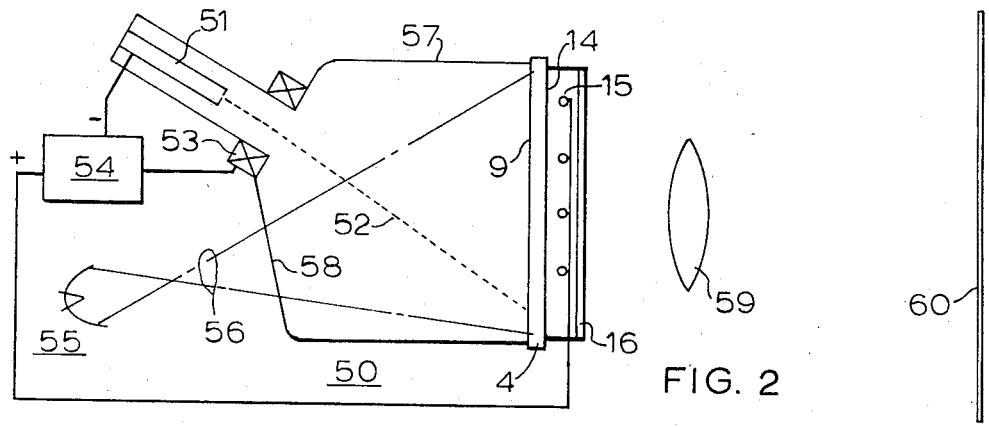
FIGURE 2 is a diagram of a more complete system in which the invention is incorporated.

In FIGURE 2 the light focussing unit 4 is represented as being a face-plate of a cathode ray device 50 having an electron gun source 51 for supplying a beam 52 of electrons and a deflection coil 53 for allowing the beam 52 to be deflected to, and thereby impinge upon, the surface 9 of the unit 4. Control signals for effecting this beam action are derived from a voltage source 54. The envelope 57 of the device 50 is provided with a window 58 through which a beam of light 56 from a light source 55 will be permitted to flood the entire surface 9 of the unit 4. Also in the diagram of this figure there is a viewing screen 60 and a lens 59 for projecting light images onto the screen 60.

The first end surface 9 of FIGURE 1, therefore, will be exposed to light from a source such as that indicated so that light may enter, simultaneously, the first end surface 9 of each of the light guides 5 in the unit 4. Upon entering a light guide 5, by means of the jacket 6 the light will be conducted to the second end surface 10 after undergoing a series of reflections, and the angle of incidence of light upon reaching the second end surface 10 will extend over an extremely wide range. However, at this point in the unit 4 an object of the invention is to control the focussing of such light so that it may either be blocked by the individual masks 18 or be allowed to pass, depending upon the position and intensity of the beam of electrons 52 being directed at the surface 9.

Referring now to the adjustaable light focussing means 11, its relationship to each of the guides 5, and its behavior under the influence of the electron beam 52, the first layer 12 is illustrated as having been formed into a system of lens 30, one for each light guide 5. This layer 12, therefore, has been preformed in a manner necessary to provide each guide 5 with a fixed focus lens, and the material thereof has a predetermined index of refraction in relation to the index of refraction of each light guide 5 which has a lower index than that of the layer 12. And, to effect reflections of light through the guides 5 the index of refraction of the jacket material 6 is less than that of the guide material 5. The index of refraction of the layer 13 is also of a lower index than that of the layer 12. In view of the relatively high index of layer 12 and the preforming of its surface at the interface of layer 12 and layer 13, light from each guide 5 will be subject to a focussing effect at the interface of a guide 5 and the layer 12, and also at the interface of the layer 12 and the layer 13.

In the absence of electrons from the beam 52 at the surface 9 of the unit 4 the surface 14 of the film 13 will be uniform, or smooth, and as indicated, a focussing action of light 35 from a lens 30 will permit the light at the second end surface 10 of each guide 5 to be blocked by its corresponding mask means 18. An intense light from a source 55, for example, will not appear beyond the masking member 16, which is, of course, a function of the optical characteristics of the lens 30 system as described herein.

When in operation a positive potential will be applied to the corona generator 15 in relation to a negative potential applied to the electron gun 51 of the device 50, making available a source of positively charged ions adjacent the surface 14 of the unit 4. A further object, therefore, is to utilize the presence of these ions in conjunction with the electron beam 52 to provide adjustable light refracting surfaces 40, selectively, adjacent any of the lens 30, so as to effect a stronger focussing action of light therethrough. A stronger focusing action being accomplished adjacent a lens 30 when an electrical conductor means 7 associated therewith is exposed to the beam 52, which deforms the adjustable refracting surface 14 as a function of the electric field being established across the film 13.

The second end of each light guide 5 is preferably round, and the second terminal of each conductor means 7, adjacent the second end surface 10, encircles each light guide 5 so as to provide a round convergent type deformation in the surface 14. Such deformation 40, by effecting a stronger focussing action, allows a beam of light 41 to follow divergent paths and beyond the limits of a mask 18, corresponding to the potential, or intensity of the beam 52 impinging on the first terminal of a conductor means 7 adjacent the surface 9.

Extreme accuracy can be realized in regard to the formation of the fixed focus lens assembly 30 and the placement of the opaque masks 18 on the plate 17, when performed in accordance with the following procedures, however, it should be understood that still other methods may be used as well. After an array of light guides 5, jacket material 6 and electrical conductor means 7 has been assembled and installed as a face plate in the envelope 57 of the cathode ray device 50, using the light source 55 to illuminate the entire surface 9, a film of photographic emulsion is exposed to the light appearing at the second end surfaces of the array. When developed, this will provide an exact likeness of the surface 10 in the form of the light masking member 16. The step in the procedure will include the assembly of the member 16 and the generator 15 in their respective positions adjacent the surface 10, and oriented so that the second ends of the light guides and the opaque areas 18 are in optical alignment. Various mechanical alignment techniques well known by those skilled in this art may be employed, such as using a rigid alignment means prior to exposing the film to the light output, and then using this same means in the final assembly of the member 16.

Prior to the optical alignment of the assembly, the layer 12 of thermoplastic material is applied to the surface 10 of the array in the form of a uniform thickness and presenting a uniform, or smooth, outer surface. Due to the wide range of angles at which the light is being reflected through the second end surface of each light guide 5 when the plane at which the masks 18 are located is imaged on the screen 60 by the lens 59, these masks 18 in a background of light from the guides 5 will be displayed on the screen 60. An objective therefore is to effect a focussing of this light so that the output of each guide 5 will be projected toward its corresponding mask 18 and, thereby, blocked from view at the plane of the masks 18.

The next step in the procedure of course is to deform the outer surface of the layer 12 so as to provide a lens 30 adjacent each of the guides surface 10. This may be accomplished by applying a predetermined electric field across the layer 12 at the melting point of the layer 12, and under the control of the potentials available between the generator 15 and the beam 52. Before the removal of the field the temperature of the layer will be reduced to a point below the melting point so as to leave the layer 12 in a fixedly adjusted light refracting surface formation in accordance with the requirements hereof.

A final step in the procedure will include the application of the oil film 13. As hereinbefore stated, this film will function as an adjustable light refracting surface in response to electrical field conditions established across certain areas of its thickness dimension. It should be understood, however, that by applying a negative potential to the corona generator, instead of the positive potential indicated, an opposite focussing effect may be provided at the refracting surface 14 of the film 13. Repelling electrical forces, therefore, during the presence of the electron beam 52, will establish divergent effects, instead of convergent effects, at the surface 14 so as to control the focussing of light also in a manner necessary to circumvent the masks 18.

Figure 3:
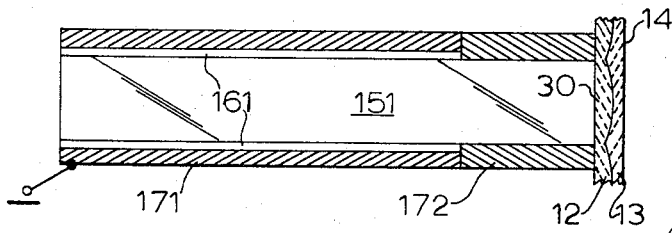
FIGURE 3 shows, in cross section, an element of the invention.

In FIGURE 3, the element shown differs from those in the unit 4 only to the extent that a photoconductor 172, in conjunction with an electrical material 171, may be used as the electrical conductor means between opposing end surfaces of the guide 151. The jacket 161 of the light guide 151 extends only to the photoconductor 172. The adjustable light refracting surface 14 will be under the control of light exposed to the photoconductor 172 independent of the light from a source 55 to which the photoconductor will not respond.

Although I have limited myself to the showing of certain embodiments of the invention, it should be understood by those skilled in the art that the invention is not to be limited in this regard since many of the other embodiments embracing the general principles and constructions hereinbefore set forth may be utilized and still be within the ambit of the present invention.

The particular embodiments of the invention illustrated and described herein are illustrative only, and the invention includes such other modifications and equivalents as may readily appear to those skilled in the art and within the scope of the appended claims.

I claim:
1. Means for utilization in a light gate system:
 (a) a light guide having first and second ends, said second end having a predetermined cross section;
 (b) electrical conductor means having first and second terminals, said second terminal encircling said cross section adjacent said second end;
 (c) light focussing means disposed upon and intimately joined with said second end and said second terminal and presenting an adjustable light refracting surface;
 (d) a source of ions with means for exposing said light refracting surface thereto;
 (e) a source of radiant energy; and
 (f) means for utilizing said energy to extend the influence of said ions between said refracting surface and said second terminal.
2. The means as set forth in claim 1 wherein
 (g) said light focusing means including a first layer of light conducting material, having a predetermined index of refraction and a fixedly adjusted light refracting surface, and a second layer of light conducting material, having an index of refraction less than said predetermined index and an adjustable light refracting surface, disposed upon and intimately joined with the refracting surface of said first layer, said surface of said second layer being exposed to said source of ions.
3. The means as set forth in claim 1 wherein
 (g) said source of radiant energy including a beam of electrons with means for allowing said beam to impinge on said first terminal and thereby extend the influence of said ions between said light refracting surface and said second terminal.

4. The means as set forth in claim 3 wherein it includes
   (h) a source of light and means for exposing the first end of said light guide thereto simultaneously with said impingement of electrons on said first terminal.

5. The means as set forth in claim 2 additionally including
   (h) said light guide having an index of refraction less than said predetermined index of said first layer so as to contribute toward a focussing of light from said light guide at the interface of the second end of said light guide and said first layer.

6. The means as set forth in claim 3 additionally including
   (h) an evacuated container; and
   (i) means for supporting a plurality of said light guides and said electrical conductor means in an electron target area of said container so that a plurality of first terminals thereof may be impinged selectively by said beam.

7. The means as set forth in claim 6 wherein
   (j) said source of ions including a corona generating means supported externally of said container and closely adjacent the light refracting surface of the light focussing means of said plurality of light guides.

8. The means as set forth in claim 7 additionally including
   (k) a plurality of light masks supported a predetermined distance from said light refracting surface wherein each mask is in optical alignment with each of said light focussing means.

References Cited

UNITED STATES PATENTS

| | | | |
|---|---|---|---|
| 3,238,296 | 3/1966 | Nelson | 178—7.5 |
| 3,385,927 | 5/1968 | Hamann | 178—7.5 |

FOREIGN PATENTS 481,592  3/1938  Great Britain.

ROBERT L. GRIFFIN, *Primary Examiner.*

J. A. ORSINO, JR., *Assistant Examiner.*

U.S. Cl. X.R.

178—6.6, 7.5; 313—91, 117; 350—160, 161